(12) United States Patent
Hirose et al.

(10) Patent No.: US 6,626,075 B2
(45) Date of Patent: Sep. 30, 2003

(54) COMPOSITE NC LATHE

(75) Inventors: Tomoyasu Hirose, Ishikawa-gun (JP);
Tadashi Yamamoto, Ishikawa-gun (JP);
Manabu Sawada, Ishikawa-gun (JP)

(73) Assignee: Nakamura-Tome Precision Industry Co., Ltd., Ishikawa (JP)

( * ) Notice: Subject to any disclaimer, the term of this patent is extended or adjusted under 35 U.S.C. 154(b) by 0 days.

(21) Appl. No.: 09/888,542

(22) Filed: Jun. 26, 2001

(65) Prior Publication Data

US 2002/0014139 A1 Feb. 7, 2002

Related U.S. Application Data

(63) Continuation of application No. PCT/JP00/07505, filed on Oct. 26, 2000.

(30) Foreign Application Priority Data

Oct. 28, 1999 (JP) .......................... 11-306507

(51) Int. Cl.⁷ .............................. B23B 7/00; B23B 9/00
(52) U.S. Cl. ........................................ 82/118; 82/121
(58) Field of Search ........................ 82/117, 118, 119, 82/120, 121, 129, 133, 138

(56) References Cited

U.S. PATENT DOCUMENTS

| | | | | |
|---|---|---|---|---|
| 3,286,595 A | * | 11/1966 | Wollenhaupt | 483/32 |
| 5,007,151 A | * | 4/1991 | Gusching | 29/27 C |
| 5,127,140 A | * | 7/1992 | Oiwa et al. | 29/27 C |
| 5,152,201 A | * | 10/1992 | Izawa | 82/1.11 |
| 5,392,501 A | * | 2/1995 | Sonnek | 29/27 C |
| 5,885,199 A | * | 3/1999 | Shao | 29/27 C |

FOREIGN PATENT DOCUMENTS

| | | | |
|---|---|---|---|
| EP | 0 374 259 A1 | | 6/1990 |
| EP | 0 900 627 A2 | | 3/1999 |
| JP | A 60-141402 | | 7/1985 |
| JP | A 3-222012 | | 1/1991 |
| JP | A 3-208501 | | 9/1991 |
| JP | A 3-251301 | | 11/1991 |
| JP | A 4-283003 | | 10/1992 |
| JP | 4-365501 | * | 12/1992 |
| JP | A 5-31601 | | 2/1993 |
| JP | A 5-345203 | | 12/1993 |
| JP | 6-134601 A | * | 6/1994 |
| JP | A 7-500056 | | 1/1995 |
| JP | A 8-126901 | | 5/1996 |
| WO | WO 94/22639 A1 | * | 10/1994 |

* cited by examiner

Primary Examiner—Henry W. H. Tsai
(74) Attorney, Agent, or Firm—Oliff & Berridge, PLC

(57) ABSTRACT

A two-opposed-main-shaft type composite NC lathe provided with a tool changeable tool spindle and tool turrets, comprising: a left turret rest and a right turret rest provided on a lower front side of a left main shaft and a right main shaft facing each other on a Z-axis; a third tool rest positioned on an upper rear side of the left and right main shafts and provided with a tool spindle; a tool magazine holding tools therein which are to be fixed to the third tool rest; and an automatic tool changing device. The left and right main shafts are provided with main shaft motors capable of controlling a C-axis and being driven independently and synchronously with each other. The tool spindle on the third tool rest is capable of controlling the directions of the Z-axis, an X-axis, a Y-axis and a B-axis and fixing the rotations thereof.

6 Claims, 5 Drawing Sheets

COMPOSITE NC LATHE

Japanese Patent Application No. 11-306507, filed Oct. 28, 1999 hereby incorporated by reference in its entirety. International Application No. PCT/JP00/07505, filed Oct. 26, 2000 is hereby incorporated by reference in its entirety.

TECHNICAL FIELD

This invention relates to a composite NC lathe which has enabled a processing operation like that of a machining center by providing a tool spindle having an ATC (automatic tool changing device), and provides a two opposed main shaft lathe provided with a tool changeable tool spindle and tool turrets.

BACKGROUND

The directions (control axes of a NC machine) of work and cutting tool operations on a NC lathe are represented by X, Y, Z and A, B, C. A Z-axis represents the direction of main shafts, an X-axis the direction in which a tool cuts into a work and is fed, a Y-axis the direction in which the Y-axis is orthogonal to both the Z-axis and X-axis, a C-axis an angle around the Z-axis, an A-axis an angle around the X-axis, and B-axis an angle around the Y-axis.

Conventionally, a two-opposed-main-shaft and two-opposed-tool-turret lathe provided with a left main shaft and a right main shaft facing each other on the same axis and two tool turrets which are the left and right tool turrets corresponding to the respective main shafts are known (Japanese Patent Application Laid-Open Nos. 3-222012 and 8-126901). In this type of lathe, at least one of the main shafts is provided movable in the direction of the Z-axis, and a work is transferred between the left and right main shafts in accordance with a movement of a main shaft in the direction of the Z-axis. Because a work is transferred between the left and right main shafts, the processing of the work as a whole including the portion thereof which is gripped by a chuck can be carried out on the same machine.

Moreover, in this kind of lathe made capable of fixing rotary tools, such as milling cutters and drills and the like to tool turrets, the flattening, drilling and thread cutting of a circumferential surface of a work can be done by controlling the left and right of the Z-axis, the X-axis and the C-axis. This enables works of a variety of shapes to be processed throughout from a state of a raw material to that of a finished product on the same machine.

However, it is inevitable that the movable main shafts are less rigid compared with fixedly provided main shafts. Therefore, a heavy load cutting operation by a lathe having movable main shafts is restricted. Although the tool turrets are capable of changing tools in use in a short period of time, the bearing rigidity of the tools and the dimensions of usable tools are restricted because limitations are placed on support structures for the turrets and the weight and dimensions of the same.

In such a conventional lathe having two opposed main shafts and two opposed turrets, the two tool turrets are provided on the rear side of the main shafts when viewed from the side of an operator so as to maintain a work attaching to and detaching from the main shafts and to allow an operator approach the machine. Furthermore, the lathe also includes a third turret disposed on the front side of the main shafts in addition to two tool turrets disposed on the rear side of the main shafts.

A composite NC lathe provided with a single main shaft, and a single ATC-carrying tool spindle capable of controlling a B-axis and provided on a tool rest is known (Japanese Patent Application Laid-Open No. 4-283003). This kind of lathe is provided with a rotary tool such as a milling cutter and the like on the tool spindle, and capable of carrying out a processing operation of a machining center such as a process for making a large hole or flattening a diagonal surface. In this lathe, a turning process may be carried out by a turning tool which is fixed to the tool spindle in a rotation-stopped state. In this kind of composite NC lathe, only one tool spindle is fixed to the tool rest, and it is therefore possible to increase the bearing rigidity of the tools and the rotational torque imparted to the tools. This enables a heavy load cutting operation to be carried out, and large-size tools to be fixed to the tool spindle. Since many tools can be held in a tool magazine of ATC, a work can be processed by many kinds of tools. However, the ATC takes much time to change tools, and reduces a processing efficiency since a processing operation cannot be carried out when the tools are changed. When a work of an elongated shape is cut to a large depth with a tool, the work is bent due to a cutting reaction force, and a heavy load cutting operation can not be carried out.

A single-main shaft single-spindle single-turret type composite NC lathe which is a single-main shaft single-spindle type composite NC lathe added with a tool turret as mentioned above has further been provided (Japanese Patent Application Laid-Open No. 5-31601). In the lathe of this structure, a tool spindle is provided on the rear side of the main shaft when viewed from the side of an operator, and a tool turret on the front side of the main shaft.

However, when one of two tool rests is formed of an ATC-carrying tool rest with the other formed of a turret tool rest, the imbalance of processing load and processing efficiency between the turret side and the ATC side becomes large, and much time is lost due to the transfer of the tool rest and a tool changing operation of the ATC. Therefore, the processing efficiency cannot be sufficiently improved.

SUMMARY

Due to the recent progress in technology and the diversification of demands, an increase in the kind of works and a decrease in the quantity thereof have become inevitable even at machine manufacturing sites. Moreover, the labor saving and the improvement of the productivity have been on demand. In order to meet such requirements, it is necessary to process works of various shapes in a state of raw material into finished products efficiently on the same machine. In the present invention, it is unnecessary to make an arrangement for changing the kind of the machine in use when the operation for transferring works between many kinds of machines and the kind of works are changed. Moreover, a loss of time during the processing operation is avoided, and the heavy load cutting of a work becomes possible. This enables many kinds of works to be processed continuously in an unmanned condition with a high efficiency.

The composite NC lathe according to the present invention is provided with a left main shaft 1L and a right main shaft 1R facing each other on the same axis, a left turret tool rest 8L and a right turret tool rest 8R positioned on the lower front side of the main shafts 1L, 1R, when viewed from the side of an operator, a third tool rest 6 positioned on the upper rear side of the main shafts 1L, 1R when viewed from the side of the operator, a tool magazine 19 holding tools to be fixed to the third tool rest, and an automatic tool changing device 20 for these tools. The left turret tool rest 8L and right turret tool rest 8R are provided with tool turrets 9L, 9R respectively on which many tools can be fixed. The third tool rest 6 is provided with a tool spindle 14 directed toward a work. The left main shaft 1L and right main shaft 1R are connected to main shaft motors 4L, 4R that can control C-axis and can be driven independently or synchronously. The movement of the third tool rest 6 can be set in the directions of the Z-axis, X-axis and Y-axis. The tool spindle 14 is provided on the tool rest 6. Furthermore, the tool spindle 14 is capable of controlling the position in the direction the B-axis and fixing the position.

When the composite NC lathe according to the present invention is used, the processing of a work can be continued by simultaneous operations of the left turret tool rest and right turret tool rest even while the tools are changed on the third tool rest (which will hereinafter be referred to as "composite tool rest") 6 provided with the ATC-carrying tool spindle 14. Only a special processing operation and a heavy-load processing operation which cannot be carried out on the turret tool rests may be carried out on the composite tool rest. Therefore, it is possible to minimize the influence which a tool changing operation of the composite tool rest and the transfer time of the tool rest exert on decreasing the processing efficiency, and a processing cycle time can be improved.

In the processing of a bar material in which both end portions of an elongated work are gripped by the left main shaft and right main shaft, a balanced cutting operation can be carried out by a composite tool rest of a large cutting reaction force and two turret tool rests of a small cutting reaction force. Namely, a heavy load cutting operation not accompanied by the flexure of the work can be carried out, and a further improvement of the processing efficiency can be attained.

When the left main shaft 1L is provided fixedly in the structure according to this invention, it is possible to improve the bearing rigidity of a work in the processing work in a first step, and to simplify a method of supplying a bar material through a central hole of the left main shaft. When the right main shaft 1R is provided so that this shaft can be moved in the direction of the Z-axis, the transfer of a work between the left main shaft and right main shaft can be carried out. When a locking device for mechanically stopping the movement of the right main shaft in the direction of the Z-axis is provided, the rigidity of the right main shaft during a heavy load cutting operation can be heightened.

When both the left and right tool turrets 9L, 9R are provided so that they can be moved in the direction of the Z-axis and the direction of the X-axis, it is possible to carry out a simultaneous processing operation using an arbitrary combination of the composite tool rest and two turret tool rests. In this case, when the left and right tool turrets 9L, 9R are rendered movable from a position in which the left main shaft is opposite to a work to a position in which the right main shaft is opposite to the work, it is possible to freely combine the left and right main shafts and tool turrets, and the kind of the tools usable for the processing operation on each side can be increased.

When the tool turrets 9L, 9R are formed so that rotary tools can be fixed thereto, it is possible to process a work stopped by the rotary tools on the turrets simultaneously with a milling process applied to the work on the composite tool rest.

When the tool turrets 9L, 9R are fixed to the portions of the respective tool rests 8L, 8R which are close to the opposite tool rests, the tools on the two tool turrets can be brought close to each other. Therefore, the processing of the work gripped by one main shaft can be done easily by using the two tool turrets.

Figure 1:
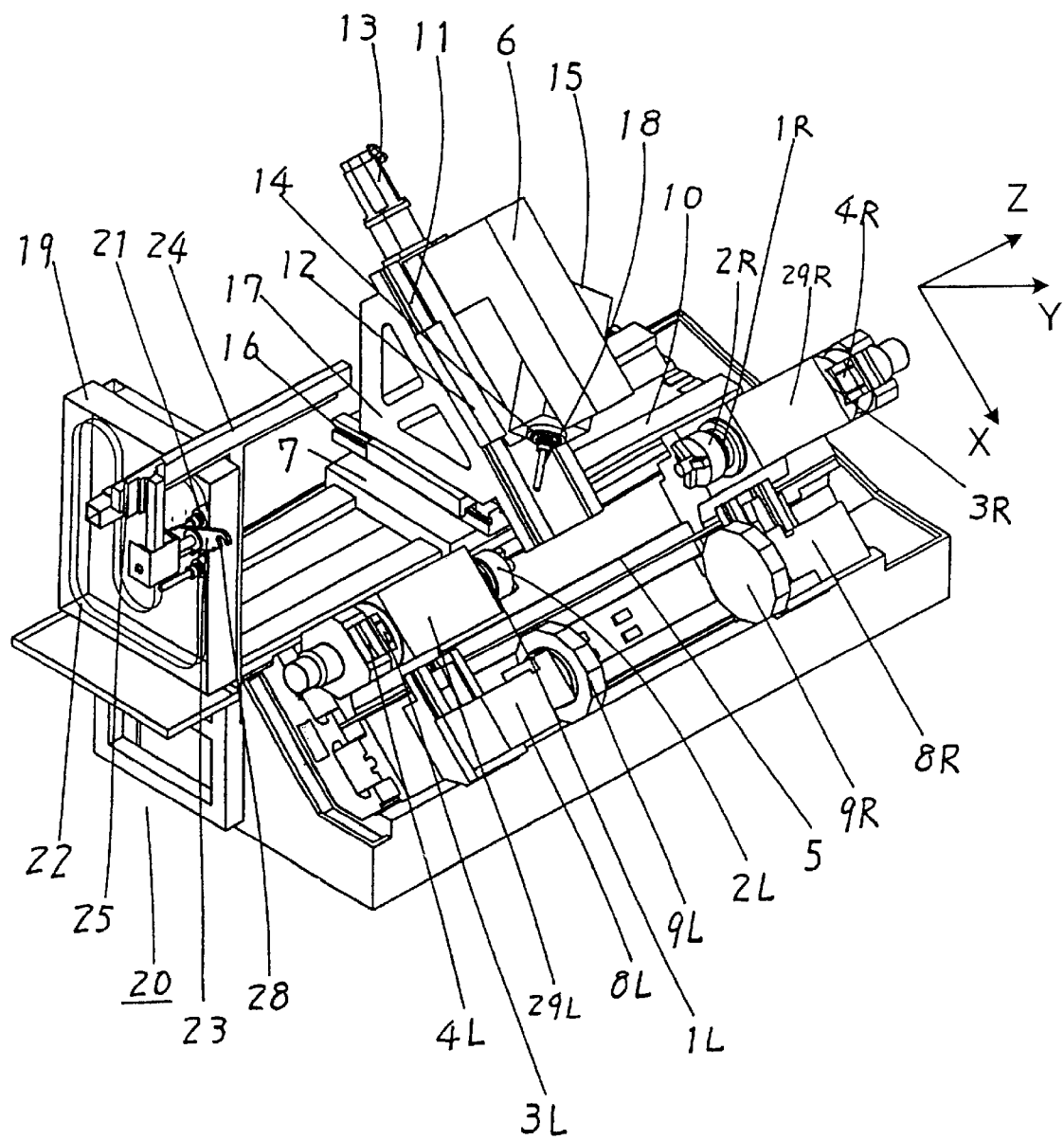
FIG. 1 is a general perspective view of one embodiment of the composite NC lathe according to the present invention.

Referring to the drawings, reference numerals 29L, 29R denote left and right head stocks, a reference numeral 6 a composite tool rest, reference numerals 8L, 8R left and right turret tool rests, and 9L, 9R left and right tool turrets, a reference numeral 14 a tool spindle, 19 a tool magazine of ATC, and 20 an automatic tool changing device.

DETAILED DESCRIPTION

The composite NC lathe shown in the drawings is provided with a left head stock 29L and a right head stock 29R facing each other on the same axis. A left chuck 2L and a right chuck 2R are provided on the opposite end portions of the main shafts supported on the two head stocks 29L, 29R. The left and right main shafts are rotated separately and synchronously as necessary by main shaft motors 4L, 4R which can control C-axis and contains encoders in portions 3L, 3R thereof. The left head stock 29L is fixed to a bed 5, while the right head stock 29R is movable in the direction of the Z-axis. When a heavy load cutting process is carried out, the right head stock 29R can be fixed to the bed 5 by a clamp device (not shown) adapted to hold the right head stock 29R with hydraulic power. The bed 5 is a slanted type inclined at an angle of 30 to 45 degrees in the direction in which a front portion of the bed is lower when viewed from the side of an operator. A rear portion of the bed 5 is formed of a horizontal guide surface adapted to guide a movable carriage 7 for a composite tool rest 6 in the direction of the Z-axis. Turret tool rests 8L, 8R movable in the directions of the X-axis and Z-axis respectively are provided on the lower front side of the main head stocks 29L, 29R. The turret tool rests are provided on the sides thereof which are close to the other turret tool rests. In other words, tool turrets 9L, 9R are provided at a right end portion of the left turret tool rest and at a left end portion of the right turret tool rest. A guide for the movements of the right head stock 29R and two turret tool rests 8L, 8R in the direction of the Z-axis is provided on an inclined surface on the front side of the bed 5. The turret tool rests 8L, 8R are moved in the direction of the Z-axis by a feed screw provided in parallel with this guide. When two feed screws engaged with the turret tool rests 8L, 8R are provided apart by a distance close to a width of the bed, it is possible to process a work held by the right main shaft by means of a tool on the left tool turret as well as a work held by the left main shaft by means of a tool on the right tool turret.

Although the details are not shown in the drawings, the two turrets 9L, 9R are capable of fixing rotary tools such as a milling cutter and the like thereto, and a light load milling process and a hole making process can be carried out on the side of the turrets 9L, 9R.

Concerning the structures of the head stocks 29L, 29R and turret tool rests 8L, 8R, the left head stock 29L is most preferably provided fixedly. When such a structure is employed, the structure of, for example, a bar feeder used to supply a work to a processing region through the center of the left main shaft by using the bar feeder can be simplified. The right head stock can be provided so that it does not move thereof in the direction of the Z-axis. In this case, the delivery of a work from the left side to the right side is carried out by utilizing a hand of a loader/unloader which is adapted to load and unload a work onto and from the lathe. The left turret tool rest 8L is naturally made movable only in the directions of the Z-axis and X-axis. The right turret tool rest 8R can also be made movable in the direction of the X-axis when the right head stock 29R is set movable in the direction of the Z-axis. However, more preferably, it is recommended that the right turret tool rest be provided movable in the directions of the Z-axis and X-axis so as to constantly utilize the right turret tool rest 8R when a processing operation is carried out with the right head stock 29R fixed so as to bear a heavy load.

The movable carriage 7 for the composite tool rest 6 is provided movable in the direction of the Z-axis and along the Z-axis direction guide 10 provided on a horizontal surface on the rear side of the bed 5. This movable carriage is provided thereon with a longitudinal guide 16 extending horizontally so as to cross the Z-axis at right angles thereto. Furthermore, an inclined base 17 is adapted to be movable along this guide by an inclined base-moving motor (not shown). This inclined base is provided with an upper surface extending at an angle equal to that of a slanting surface at the front side of the bed, and an X-axis direction guide 11 is provided on the same upper surface. The inclined base 17 is mounted with a feed base 12 for the composite tool rest 6 so that the feed base can be moved along the X-axis direction guide 11 by a feed motor 13. This feed base 12 has a rotary tool base 15 provided with a tool spindle 14 and fixed thereto so that the tool base can be turned to left and right at 90 degrees respectively around a B-axis with a position in which the tool spindle is set so as to face in the direction of the X-axis as an origin.

The tool spindle 14 is formed so that the rotation thereof can be stopped sharply by a locking device (not shown) contained in the rotary tool rest 15. Therefore, rotary tools, such as a milling cutter, a drill and the like can naturally be attached to the tool spindle 14. It is also possible to fix turning tools (bit and the like) to the tool spindle 14 in a locked state.

A tool 18 fixed to the tool spindle 14 on the composite tool rest 6 formed as described above can make operations which will be described below. First, as basic operations of the tool rest of a lathe, the movement thereof in the directions of the Z-axis and X-axis can be set owing to a movement of the movable carriage 7 in the direction of the Z-axis and a movement of the feed base 12 in the direction of the X-axis. Moreover, the direction in which the tool extends can be inclined freely toward the first head stock or the second head stock owing to a B-axis control operation of the rotary tool rest 15. Furthermore, the movement of the feed base 12, i.e. the tool spindle 14 in the direction of the Y-axis can be set by controlling a longitudinal movement of the inclined base 17 and an X-axis movement of the feed base 12 synchronously in the relation corresponding to an angle of inclination of an upper surface of the inclined base 17. Namely, when the tool spindle 14 to which, for example, a face milling cutter is fixed is moved in the direction of the Y-axis with a C-axis movement of the main shafts stopped, a large flat surface parallel to the main shafts can be formed on a circumferential surface of the work. It is also possible to form an inclined flat surface and a curved flat surface by controlling an angle of the tool spindle 14 around the B-axis.

An ATC 20 having a tool magazine 19 for tools to be fixed to the composite tool rest 6 and adapted to attach and detach a tool in this tool magazine to and from the tool spindle 14 on the composite tool rest is provided adjacent to a rear left end of the bed 5. The illustrated tool magazine 19 has a structure in which a circulating chain 22 to which plural tool holders 21 are connected in the outward direction with respect to the lathe is provided, and in which the selection of tools is carried out by setting one of the tools fixed to the tool holder in a transfer position with respect to the ATC 20 by a circulating movement of the circulating chain.

The ATC 20 has a structure provided with a swing arm 23 provided with tool gripping claws at both ends thereof, and this swing arm is fixed to a traverser 25 which moves forward and backward along the guide rail 24 extending in the direction of the Z-axis.

Figure 2:
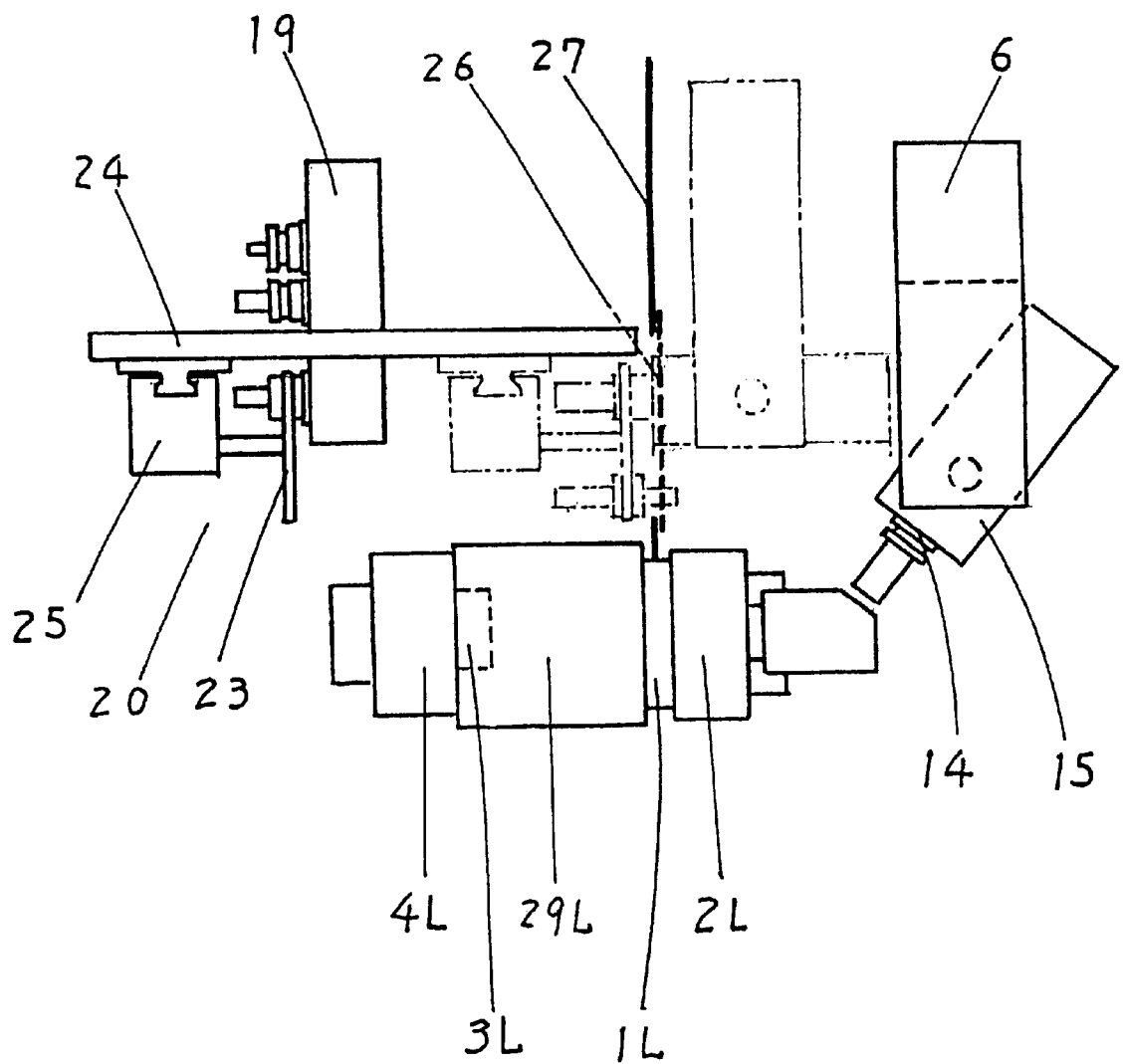
FIG. 2 is a schematic diagram showing the relationship between a composite tool rest and a tool magazine.

Between a space in which the tool magazine 19 and the ATC 20 are provided and a space in which the composite tool rest 6 is moved, a partition 27 having a shutter 26 is provided as shown in FIG. 2. While the composite tool rest 6 processes a work, the tool magazine 19 transfers a tool to be used in a subsequent stage to a transfer position, and the swing arm 23 of the ATC grips a selected tool by one tool gripping claw 28 thereof, transfers the tool toward the tool rest along the guide rail 24 and stands by.

When the composite tool rest 6 returns to the origin (home position) in the direction of the X-axis at a stage in which a processing operation by the fixed tool is finished. The rotary tool rest 15 is moved to a position spaced at 90 degrees around the B-axis to direct the movable carriage 7 toward the ATC. The shutter 26 is opened with the tool spindle left in this condition, and the movable carriage 7 is moved toward the ATC, the tool gripped by the tool spindle 14 being delivered to the swing arm 23. The swing arm is then turned 180 degrees, and a new tool is fixed to the tool spindle 14.

The composite tool rest 6 and ATC 20 move in the directions in which they leave each other, and the shutter 26 is closed. The ATC then returns the tool received to the tool magazine 19, which starts an operation for selecting a tool to be used in a still subsequent stage. On the other hand, the composite tool rest 6 starts carrying out a processing operation by a newly fixed tool with predetermined timing.

According to the composite NC lathe in this embodiment described above, the following work processing operation can be carried out.

Figure 3:
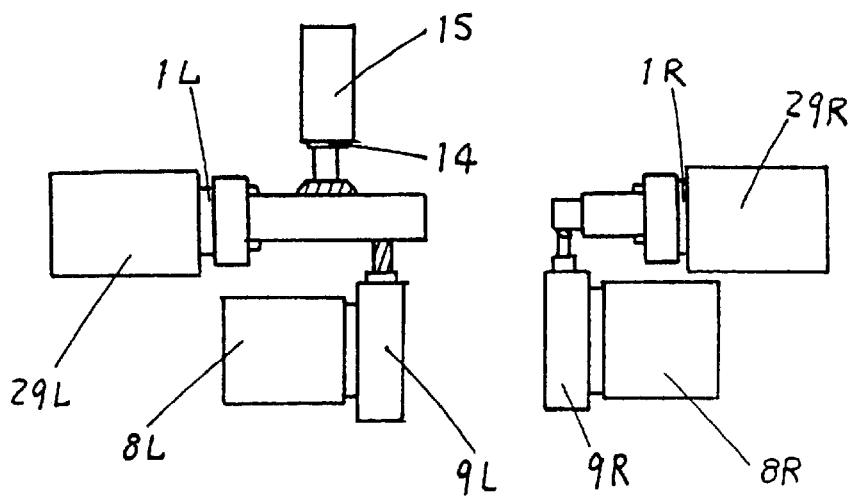
FIG. 3 shows an example work process of a flattening process operation.

A. As shown in FIG. 3, a flattening process for a left work is carried out by a milling cutter fixed to a tool spindle 14 with a left main shaft 1L fixed as a turning operation for a right work is carried out by a right turret 9R with a right main shaft 1R rotated. During this time, a heavy load cutting operation of the composite tool rest can be made possible by carrying out a drilling process for the left work by a left turret 9L simultaneously with the flattening process, and preventing the flexure of the work by pressing a receiving member fixed to the left turret 9L against the work. A processing operation with the condition of the left side and that of the right side reversed can also be carried out.

Figure 4:
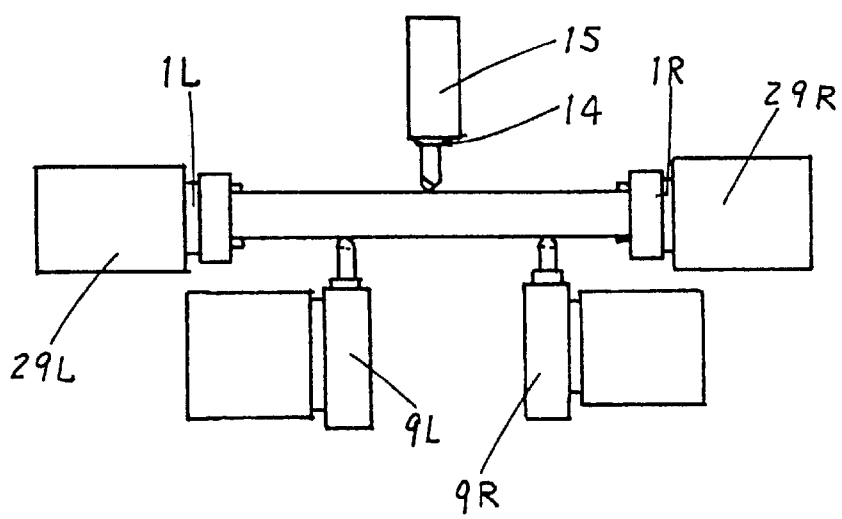
FIG. 4 shows an example work process that includes simultaneous operation by two tool turrets and a total of three turning tools.

B. As shown in FIG. 4, it is possible to turn works gripped by the left main shaft 1L and right main shaft 1R separately, or a work gripped at both end portions thereof, fix a turning tool to a tool spindle 14, and thereby process the works simultaneously by two tool turrets 9L, 9R and a total of three turning tools. During this time, a tool load on the tool spindle 14 and that on the two turrets are exerted in the directions contrary to each other, so that it is possible to carry out a balanced cutting operation not accompanied by the flexure of the work.

Figure 5:
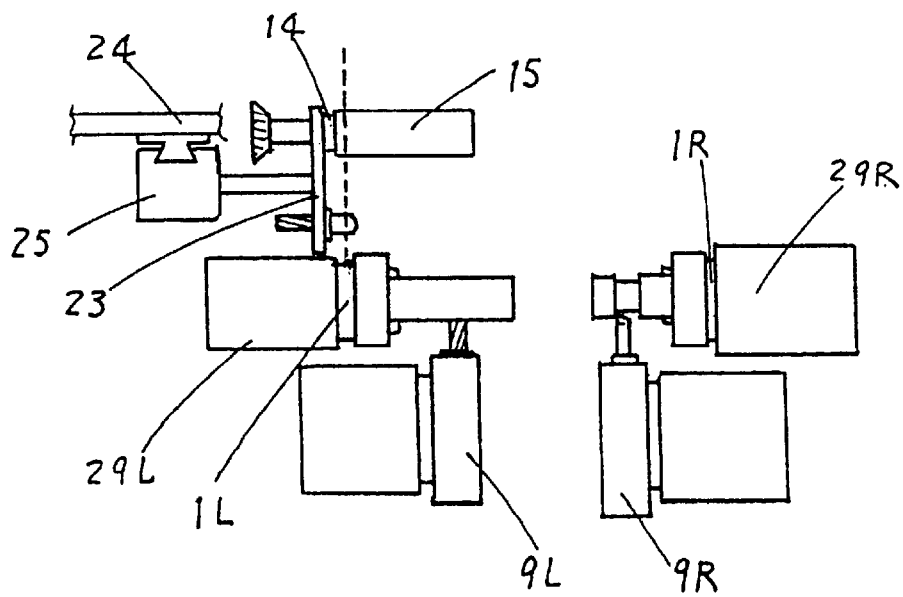
FIG. 5 shows an example work process including a tool changing operation.

C. As shown in FIG. 5, while a tool spindle 14 carries out a tool changing operation, or, while the tool spindle 14 is moved between left side and right side, the processing of works can be continued on the left side and right side by respective spindles and tool turrets.

Figure 6:
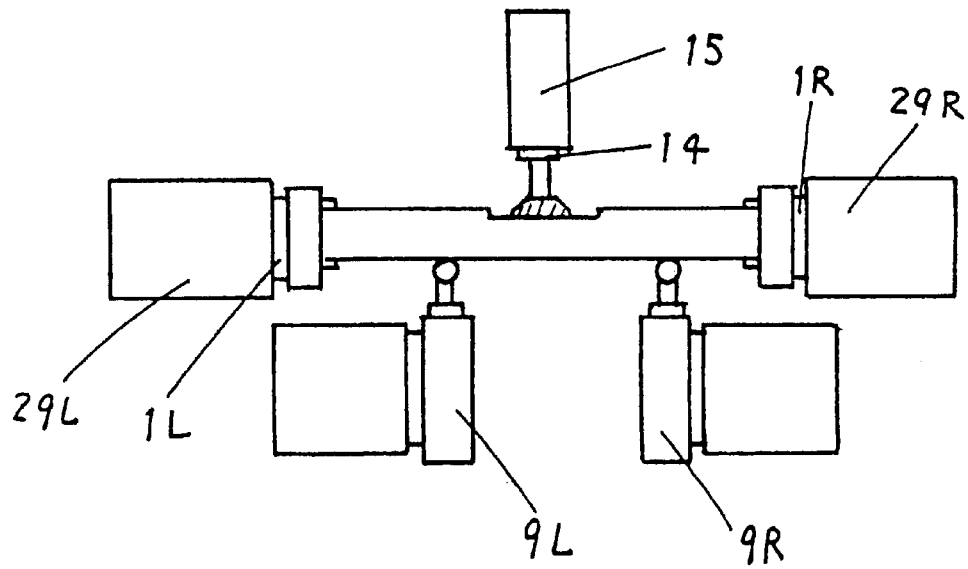
FIG. 6 shows an example work process in which the work is retained by pressing members.

D. As shown in FIG. 6, when a processing operation in which an extremely large cutting reaction force is exerted on a work by a tool fixed to a tool spindle 14, the work is retained by pressing receiving members fixed to left and right turrets 9L, 9R against the work. This enables the present invention go carry out a heavy load cutting operation, which was impossible in a conventional lathe of this kind. In this case, processing the work by rotating the work at a low speed with both end portions of the work gripped by main shafts on both sides is also possible, in which it is possible to exert on the work a large torque resistant to the processing reaction force by operating the two main shafts synchronously.

Figure 7:
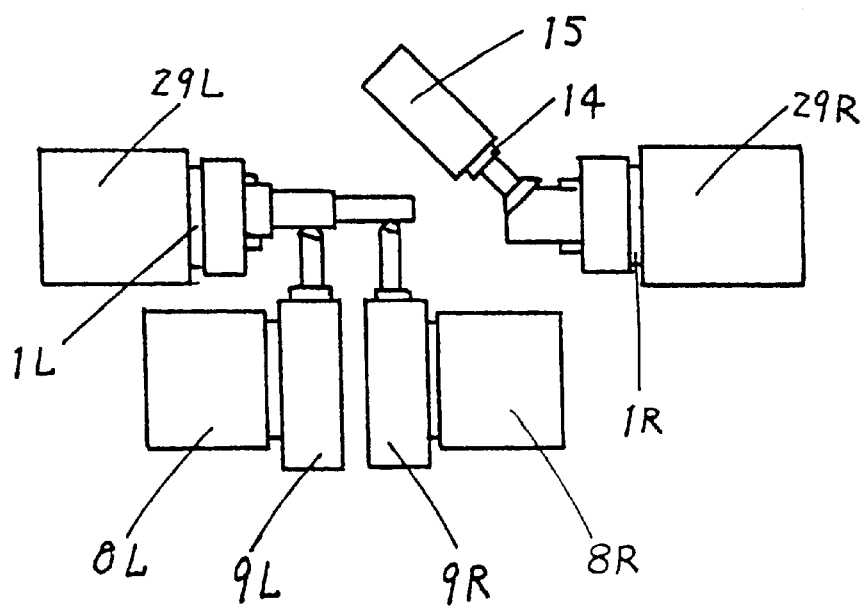
FIG. 7 shows a work profess carried out by a rotary tool on a tool spindle.

E. As shown in FIG. 7, it is possible that, while a processing operation is carried out by a rotary tool on a tool spindle 14 with one main shaft 1R fixed, a cutting process is carried out simultaneously for a work on the other main shaft 1L by two tools on both the left and right tool turrets.

Figure 8:
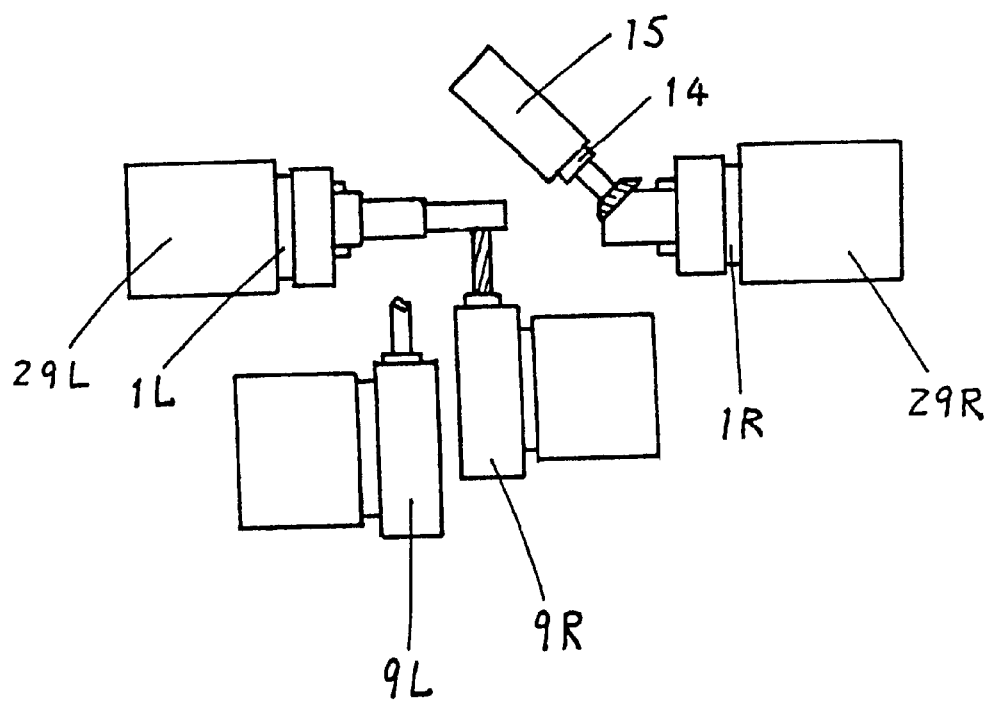
FIG. 8 shows an example work process carried out by a tool fixed to a right turret.

F. As shown in FIG. 8, a left work can be processed by a tool which is fixed only to a right turret, by drawing back the left turret 9L, and using a left main shaft 1L and a right turret 9R. It is also possible to carry out a reverse operation. When a work on the opposite side is processed at this time by a tool fixed to a tool turret 14, it is possible to prevent a decrease in a processing efficiency ascribed to the non-use of the other tool turret.

What is claimed is:

1. A composite NC lathe, comprising:
    a left main shaft and a right main shaft facing each other on a first axis;
    a left turret rest and a right turret rest positioned on a lower front side of the respective left and right main shafts when viewed from an operator;
    a third tool rest positioned on an upper rear side of the left and right main shafts when viewed from the operator and has a tool spindle directed toward a work;
    a tool magazine for holding tools to be fixed to the third tool rest; and
    an automatic tool changing device for changing tools between the tool magazine and third tool rest;
    wherein the left and right main shafts comprise respective main shaft motors capable of controlling angles around the first axis and capable of being driven independently and being synchronized with each other, wherein the third tool rest is movable in a direction of the first axis, a direction of a second axis, the direction of the second axis being a tool feeding direction, and a direction of a third axis which is orthogonal to the first and second axial directions, and wherein the tool spindle is provided on the third tool rest, the tool spindle is capable of controlling an angular position of the tool spindle around the third axis and fixing the angular position of the tool spindle, the left turret rest includes a left tool turret and the right tool rest includes a right tool turret, and
    strokes of the left and right tool turrets in the first axial direction range from a left end position opposite to a work gripped by the left main shaft to a right end position opposite to the work gripped by the right main shaft.

2. The composite NC lathe according to claim 1, wherein each of the left and right main shafts has a chuck for gripping a work at respective opposite end portions.

3. The composite NC lathe according to claim 1, wherein one of the left and right main shafts is movable in the first axial direction and the other one of the left and right main shafts is fixedly mounted on the lathe in the first axial direction.

4. The composite NC lathe according to claim 3, further comprising:
    a locking device for mechanically fixing a position in the first axial direction of one of the left and right main shafts movable in the first axial direction.

5. The composite NC lathe according to claim 1, wherein the left and right tool turrets are movable in the first and second axial directions.

6. The composite NC lathe according to claim 1, wherein the left and right tool turrets are capable of fixing rotary tools thereto and wherein the left tool turret is fixedly mounted on a right end portion of the left turret rest and the right tool turret is fixedly mounted on a left end portion of the right turret rest.

* * * * *